United States Patent
Monajemi et al.

(10) Patent No.: US 11,671,945 B2
(45) Date of Patent: *Jun. 6, 2023

(54) WIRELESS SYSTEM AND METHOD FOR INTERDEPLOYMENT BASIC SERVICE SET IDENTIFICATION AND CHANNEL OPTIMIZATION

(71) Applicant: Cisco Technology, Inc., San Jose, CA (US)

(72) Inventors: Pooya Monajemi, Irvine, CA (US); Vishal Satyendra Desai, San Jose, CA (US); Benjamin Jacob Cizdziel, San Jose, CA (US); Santosh Babaji Kulkarni, San Jose, CA (US); Young Il Choi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/537,725

(22) Filed: Nov. 30, 2021

(65) Prior Publication Data

US 2022/0086808 A1     Mar. 17, 2022

Related U.S. Application Data

(63) Continuation of application No. 16/726,554, filed on Dec. 24, 2019, now Pat. No. 11,197,272.

(51) Int. Cl.
| | |
|---|---|
| *H04W 4/00* | (2018.01) |
| *H04W 72/04* | (2023.01) |
| *H04B 17/318* | (2015.01) |
| *H04W 48/16* | (2009.01) |
| *H04W 84/12* | (2009.01) |

(52) U.S. Cl.
CPC .......... *H04W 72/04* (2013.01); *H04B 17/318* (2015.01); *H04W 48/16* (2013.01); *H04W 84/12* (2013.01)

(58) Field of Classification Search
CPC ....... H04W 72/04; H04W 4/00; H04W 84/12; H04B 17/318
USPC .................................. 370/329, 328, 331, 235
See application file for complete search history.

(56) References Cited

U.S. PATENT DOCUMENTS

| | | | | |
|---|---|---|---|---|
| 10,880,934 | B2* | 12/2020 | Huang | H04W 76/11 |
| 11,102,715 | B2* | 8/2021 | Gan | H04L 5/0053 |
| 11,197,272 | B2* | 12/2021 | Monajemi | H04W 24/02 |
| 2017/0359300 | A1* | 12/2017 | Patil | H04W 52/0212 |
| 2018/0206184 | A1* | 7/2018 | Bahr | H04W 24/02 |
| 2018/0234904 | A1* | 8/2018 | Lee | H04W 4/70 |
| 2019/0124542 | A1* | 4/2019 | Pandey | H04W 28/0231 |
| 2019/0124706 | A1* | 4/2019 | Huang | H04W 40/244 |

(Continued)

*Primary Examiner* — Marceau Milord
(74) *Attorney, Agent, or Firm* — Merchant & Gould P.C.

(57) ABSTRACT

In dense Wireless Local Area Network (WLAN) deployments, Access Points (APs) in other Extended Service Sets (ESSs) can be hidden (a first AP does not receive signals from a third AP). However, these APs in other ESSs can still interfere with communications between the third AP and the devices communicating with the first AP. To improve service to that device in that situation, the first AP needs information about the third AP in the first AP's decision making processes. In these situations, a second AP, in contact with the third AP, can share information about the third AP with the first AP so that the first AP can avoid colliding with the third AP.

16 Claims, 11 Drawing Sheets

(56) References Cited

U.S. PATENT DOCUMENTS

| | | | | |
|---|---|---|---|---|
| 2019/0335354 A1* | 10/2019 | Pandey | ................ | H04W 24/02 |
| 2020/0221378 A1* | 7/2020 | Kneckt | ................ | H04W 48/14 |
| 2021/0014914 A1* | 1/2021 | Huang | .............. | H04W 72/0446 |
| 2021/0068137 A1* | 3/2021 | Thubert | ................ | H04W 40/24 |
| 2021/0195562 A1* | 6/2021 | Monajemi | ............. | H04W 24/02 |
| 2022/0053385 A1* | 2/2022 | Li | ......................... | H04W 36/08 |
| 2022/0061109 A1* | 2/2022 | Huang | .............. | H04W 72/0446 |
| 2022/0159628 A1* | 5/2022 | Bangolae | .............. | H04W 72/04 |

\* cited by examiner

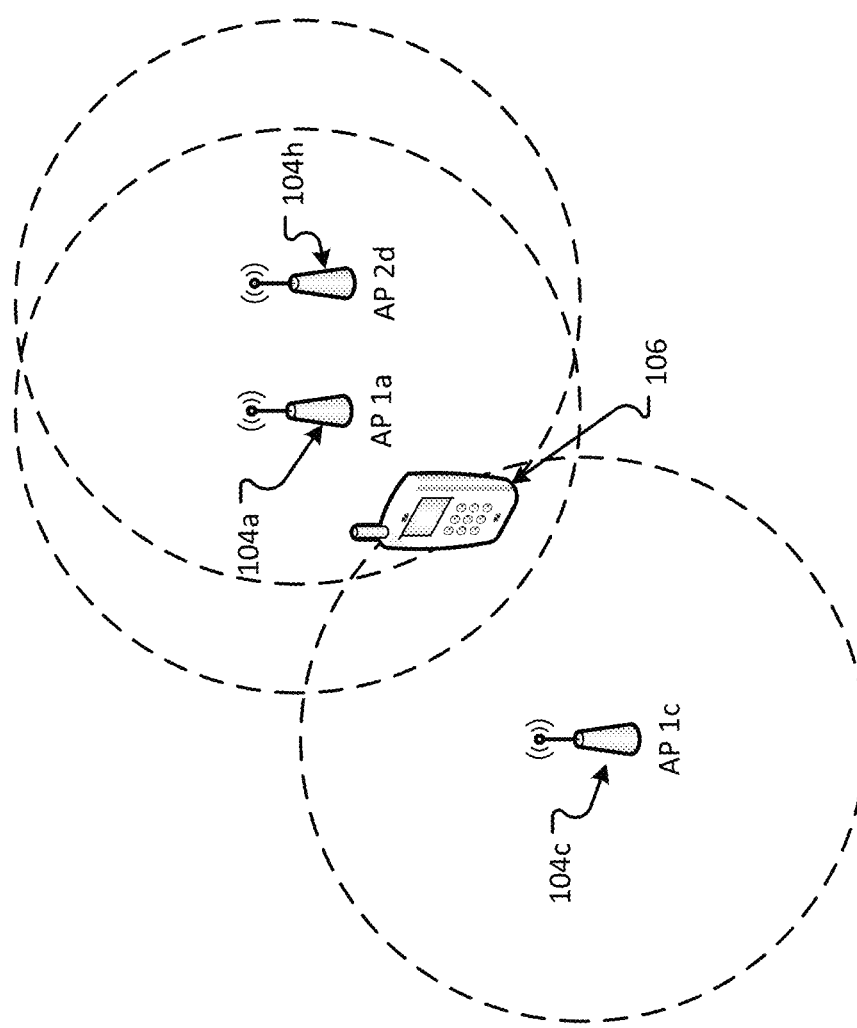

WIRELESS SYSTEM AND METHOD FOR INTERDEPLOYMENT BASIC SERVICE SET IDENTIFICATION AND CHANNEL OPTIMIZATION

RELATED APPLICATION

This application is a continuation of U.S. patent application Ser. No. 16/726,554, filed Dec. 24, 2019, the disclosure of which is incorporated herein by reference in its entirety.

TECHNICAL FIELD

An exemplary aspect is directed toward communications systems. More specifically an exemplary aspect is directed toward IEEE (Institute of Electrical and Electronics Engineers) 802.11 wireless communications systems.

BACKGROUND

Wireless systems employ processes to manage the radio resources of the wireless devices to optimize parameters including channelization, transmit power, etc. The management of the radio helps avoid or mitigate issues with signal interference. The processes to manage the radio resources is executed on a controller that may only manage the Access Points (APs) that are either joined to the same controller or joined to another controller belonging to the same Radio Frequency (RF) group, referred to as an Extended Service Set (ESS). Thus, any APs not part of the same deployment are neither jointly optimized nor fully aware of the surrounding "second-hop" neighborhood. The controllers tend to acknowledge interference when the interference is experienced by one of the managed APs in the ESS.

There are many deployment scenarios in which unmanaged sets of AP deployments are present nearby. For example, deployments in malls can have numerous ESSs that are not managed by a common controller. Even if the same network manager deploys multiple controllers, in which APs managed by the different controllers are in range of each other, radio resource management is still executed independently for only the APs managed directly by that controller. This lack of a single management source leads to the same lack of awareness and non-joint optimization as in the disjoint AP deployments.

These above scenarios present challenges in radio resource optimization.

SUMMARY

Aspects herein can comprise a method having stages for receiving, at a first AP, of a first ESS, and from a second AP, of a second ESS, information about a third AP, of the second ESS. Based on the information about the third AP, the first AP determines an adjusted Received Signal Strength Indicator (RSSI) associated with the third AP. Then, based on the adjusted RSSI, the first AP conducts Radio Resource Management (RRM) to account for the third AP.

BRIEF DESCRIPTION OF THE FIGURES

FIG. 1B illustrates an environment with APs from two ESSs that can cause interference between each other in accordance with aspects of the current disclosure;

Figure 1A:
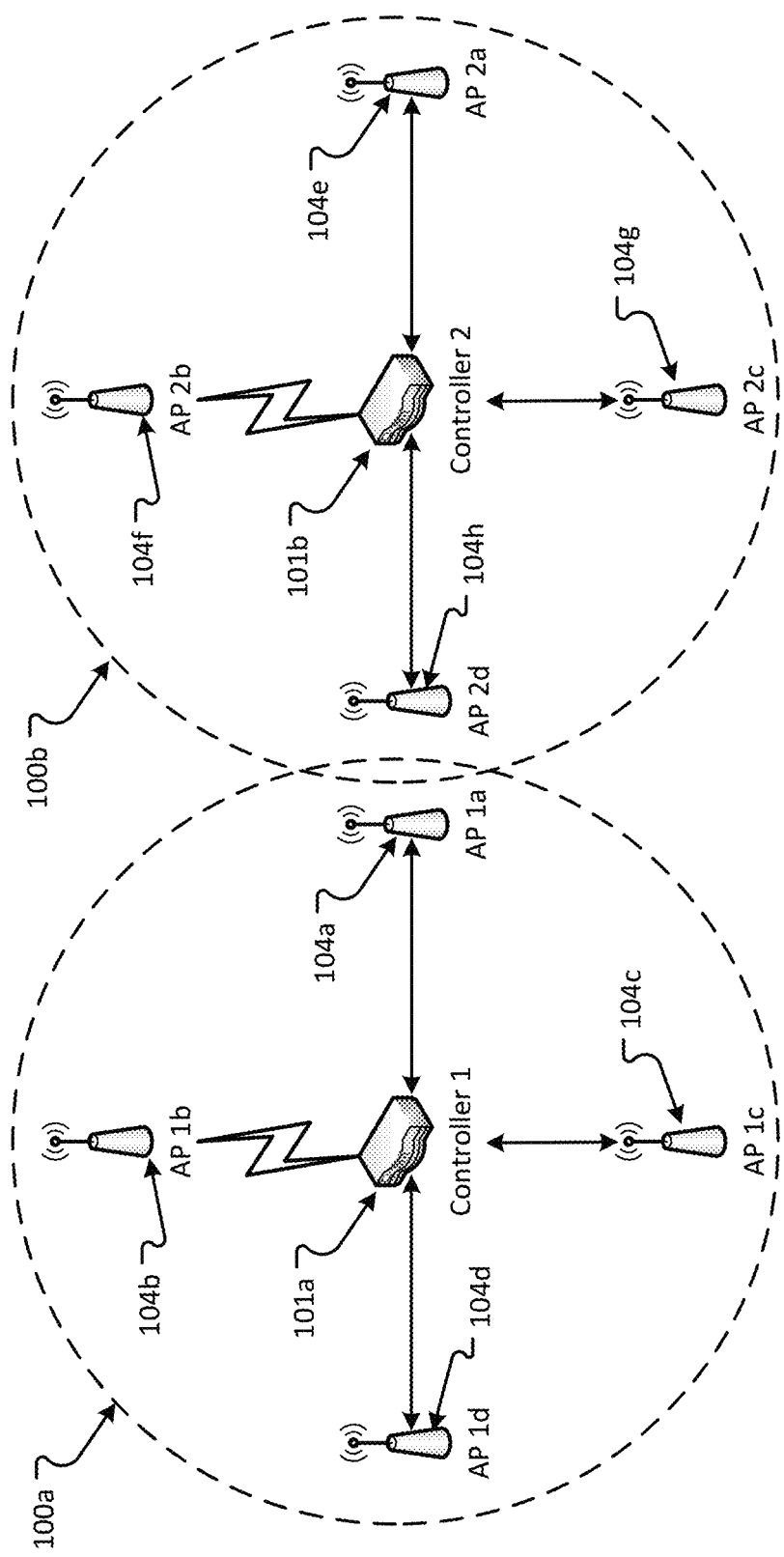
FIG. 1A illustrates an environment having two basic service sets in accordance with aspects of the current disclosure.

In the drawings, like numerals can refer to like components. A letter following the numeral indicates another instance of the same type of component. Like components can share the description of that component. When referring to a component without the letter following the numeral, all components having that numeral indicator may share that description.

DETAILED DESCRIPTION

Overview

APs can often identify nearby APs and determine or receive the parameters for those nearby APs to avoid collisions. This identification of other APs is possible when the AP can receive the signals transmitted from the other AP. However, other APs in other ESSs can be hidden (the AP does not receive signals from the other AP). However, these other APs can still interfere with communications between the AP and the devices communicating with the AP. For example, the AP may be out of range of the other AP, but a device between the APs may be in range of both APs, which can create the possibility of interference and collisions of the signals from those two APs. Thus, to improve service to that device in that situation, the AP needs information about the other AP in the AP's decision making processes.

The hidden AP with overlapping coverage problem, as described above, can be more pronounced in the case of independent ESS deployments (for example, in malls with independent vendors, in office buildings, etc.). As an example, a first AP may be part of a managed group (e.g., a first ESS). A second and third AP may both be part of another managed group (e.g., a second ESS). The third AP may cause interference with the first AP, and vice versa, because the first AP and the third AP may have overlapping coverage areas. However, the third AP may only be visible to the second AP. In this situation, a lack of awareness of the third AP by the first AP, and vice versa, can cause an adverse impact on a station or device that is communicating with the first AP or third AP but is in the coverage area overlapped by the first AP and the third AP. To assist the first AP or third AP, the second AP can provide information about the first AP or third AP to the other AP.

In a first situation, the aspects herein addresses the situation when the first AP above advertises an open Service Set IDentifier (SSID), which can be the name associated with an 802.11 Wireless Local Area Network (WLAN) that allows a device to connect to the WLAN. Many open WiFi access WLANs, in, for example, malls, stores, etc., broadcast an open SSID to offer open WiFi access to customers. Also, many residential or office Internet Service Providers (ISPs) can provide a guest SSID or an open service-provider SSID that is offered to roaming subscribers.

In this situation, a second AP or a wireless sensor, which is part of the second managed group, can spoof a first AP, which is part of another managed group, to appear as a client device desiring access to the first AP's WLAN. The second AP spoofs the first AP to associate to the open SSID. Then, the second AP can notify this first AP of the existence of a nearby third AP (that is not part of the first AP's managed group) and provide the first AP with the third AP's channel and/or BSS color information. The above notification may be provided using beacon reports and/or BSS color collision reports.

Also, the second AP in contact with the third AP can share information about the first AP with the third AP so that the third AP can avoid colliding with the first AP. Sending the above notification(s) to the first AP and/or third AP has important benefits: it prevents future decisions by the first AP that will cause collisions with third AP, it reduces the need for frequent channel and/or BSS color switches in the first AP in response to the unmanaged third AP's presence; and/or, it addresses static channel and/or BSS color assignments in the first AP.

Since the association and reporting procedure may take valuable time resources from the second AP and may occur in a different channel than the second APs operating channel, the association and reporting procedure can be performed using the auxiliary radios on the second AP or using deployed wireless sensors as mentioned above. In the case of the presence of 5G technologies managed by the same infrastructure, the channels/bandwidths used by those technologies may be also reported to the first AP as part of the beacon reports.

In a second situation, an extension of the a Neighbor Discovery (ND) packet can embed the additional information regarding a neighbor APs' channels and BSS color and can be broadcast in a Media Access Control (MAC) frame, which may be unencrypted or encrypted using a common key. In some situations, the MAC frames may be transmitted by a wireless sensor. The extended ND report in the MAC frame can include the signal strength from each neighbor, the BSS color of the neighbor, the load on the neighbor, the neighbor's spatial reuse statistics, etc.

In a third situation, an AP can receive a Neighbor Report (NR) or a Reduced Neighbor Report (RNR) from the other AP. The NR or RNR elements are intended for client roaming and contain less information than beacon reports. However, the NR and RNR still contain some relevant information about neighboring APs potentially not visible to the third AP. The NR and RNR may be included in the beacons and/or Fast Initial Link Setup (FILS) discovery frames transmitted by APs or that may be requested by actively probing.

However obtained, the information received in the above situations can improve RRM decisions in the network. Without this shared information, the RRM functions are unaware of AP's managed by other networks that are not directly observable by the network's own devices. This situation causes the AP to make suboptimal decisions that may negatively impact both the AP's own network and the other networks.

The augmented ND frames, described above, provide additional information to the RRM about inter-network APs that are observable. RRM optimization can utilize the information from augmented ND frames to decide how best to manage the radio resources. When the ND is received, the AP compares the identified, nearby APs to the previously-stored list of known, nearby APs. Any APs that are present in the list in the ND but not in the AP's own neighbor list can be added to the channelization and BSS color algorithm optimizations as another regular neighbor, however with an adjustment to the RSSI. This adjusted RSSI formula takes the proximity of the reporting device into account such that if the information is received from a device that is located far away, then the neighbors that this AP sees are of less interest.

RRM optimization utilizing information from NR or RNR can be somewhat different. Though NRs and RNRs contain much less information than the augmented ND frames, the NR and RNR can still benefit RRM. In many situations, no RSSI information is included in the NR and RNR. However, the AP can still extract the reporting AP's RSSI, addi a constant adjustment, and integrate this information back in RRM, which helps compensate for the lesser amount of information in the NR and RNR.

Aspects herein are generally directed to wireless communications systems that can perform according to one or more wireless communications standards. For example, some aspects may involve wireless communications performed according to Wi-Fi standards developed by the IEEE 802.11, for example, may involve wireless communications performed in accordance with an IEEE 802.11ax. Some aspects may involve wireless communications performed in accordance with other standards, rules, regulations, guidance, etc. Some aspects may additionally or alternatively involve wireless communications according to one or more other wireless communication standards, for example, and without limitation, other IEEE wireless communication standards, such as the IEEE 802.11, IEEE 802.11a, IEEE 802.11b, IEEE 802.11g, IEEE 802.11n, IEEE 802.11u, IEEE 802.11ac, IEEE 802.11ad, IEEE 802.11af, IEEE 802.11 ah, and/or IEEE 802.11ay standards, Wi-Fi Alliance (WFA) wireless communication standards, such as, Wi-Fi, Wi-Fi Direct, Wi-Fi Direct Services, Wireless Gigabit (WiGig), WiGig Display Extension (WDE), WiGig Bus Extension (WBE), WiGig Serial Extension (WSE) standards and/or standards developed by the WFA Neighbor Awareness Networking (NAN) Task Group, Machine-Type Communications (MTC) standards such as those embodied in 3GPP Technical Report (TR) 23.887, 3GPP Technical Specification (TS) 22.368, and/or 3GPP TS 23.682, and/or Near-Field Communication (NFC) standards such as standards developed by the NFC Forum, including any predecessors, revisions, progeny, and/or variants of any of the above.

Likewise, some aspects may involve wireless communications performed according to one or more broadband wireless communication standards, for example, 3rd Generation Partnership Project (3GPP), 3GPP Long Term Evolution (LTE), and/or 3GPP LTE-Advanced (LTE-A) technologies and/or standards. Additional examples of broadband wireless communication technologies/standards may include Global System for Mobile Communications (GSM)/Enhanced Data Rates for GSM Evolution (EDGE), Universal Mobile Telecommunications System (UMTS)/

High Speed Packet Access (HSPA), and/or GSM with General Packet Radio Service (GPRS) system (GSM/GPRS), IEEE 802.16 wireless broadband standards such as IEEE 802.16m and/or IEEE 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1.times.RTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards.

Example Embodiments

FIGS. 1A and 1B illustrate an example of an operating environment associated with aspects herein. The WLANs may comprise an extended service set (ESS) 100a, 100b that may include a master station or controller 101a, 101b, one or more APs 104a-104h, and one or more devices or stations (STAs) 106. The controller or master station 101a, 101b may be an AP using the IEEE 802.11 protocol(s) to transmit and receive. Hereinafter, the term AP will be used to identify the controller 101, but the configurations may not be limited to the AP performing the functions described herein as a separate controller may also perform the functions.

Figure 9:
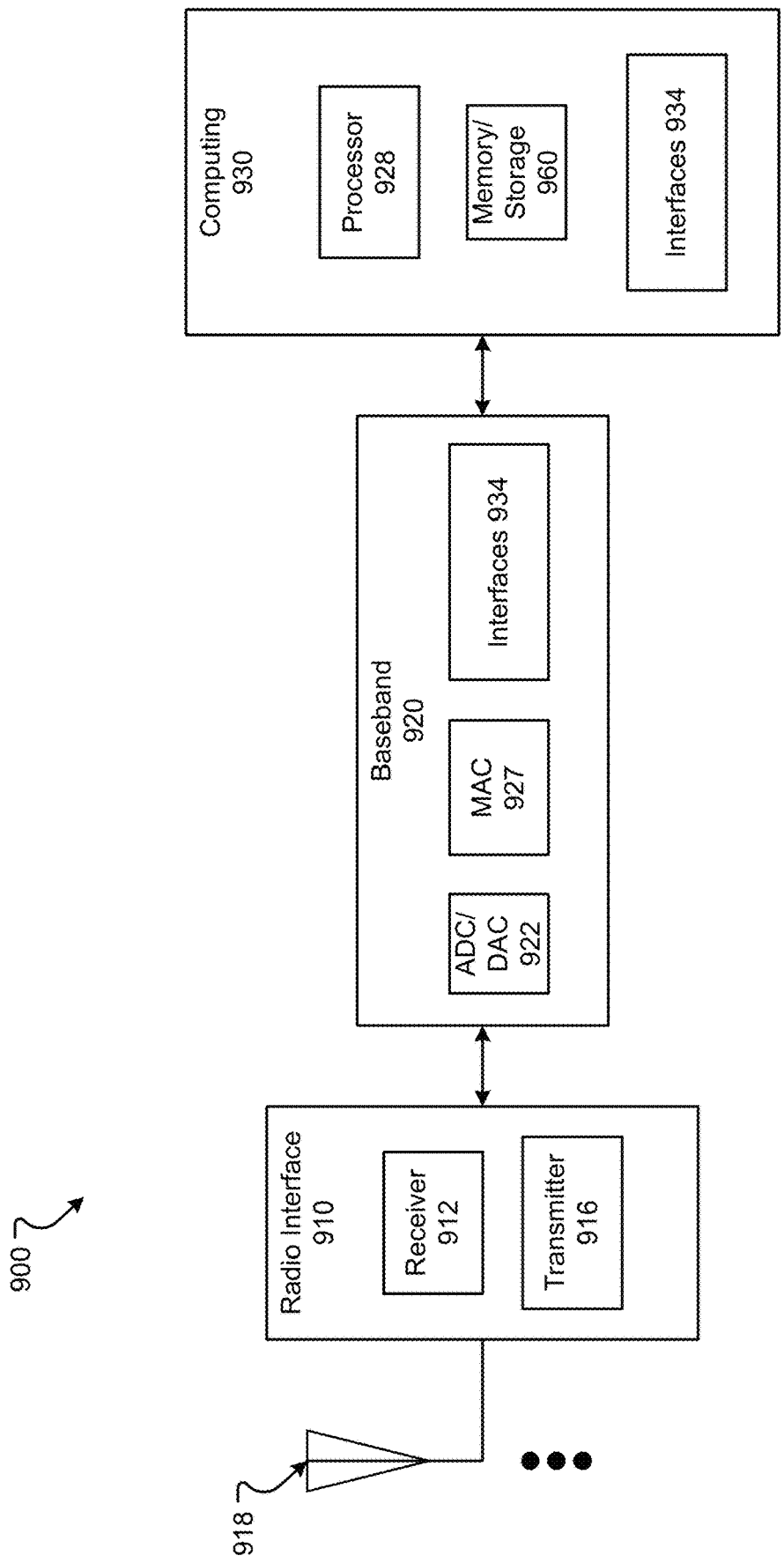
FIG. 9 illustrates an embodiment of a station or access point in accordance with aspects of the current disclosure.

The AP 104 may be a base station and may use other communications protocols as well as the IEEE 802.11 protocol. The IEEE 802.11 protocol may include using Orthogonal Frequency-Division Multiple Access (OFDMA), Time Division Multiple Access (TDMA), and/or code division multiple access (CDMA). The IEEE 802.11 protocol may include a multiple access technique. For example, the IEEE 802.11 protocol may include Space-Division Multiple Access (SDMA) and/or Multiple-User Multiple-Input Multiple-Output (MU-MIMO). An example configuration of the APs 104 and/or controllers 101 may be as shown in FIG. 9.

The STAs 106 may include one or more High-Efficiency (HE) (as illustrated in, e.g., the IEEE 802.11ax standard) STAs, future-developed STAs, and/or one or more legacy (as illustrated in, e.g., the IEEE 802.11n/ac standards) STAs. The STAs 106 may be a wireless devices, for example, a cellular telephone, a smart telephone, a handheld wireless device, wireless glasses, a wireless watch, a wireless personal device, a tablet, or another device that may be transmitting and receiving using a IEEE 802.11 protocol. In the operating environment, an AP 104 may generally manage access to the wireless medium in the WLAN for the STA 106.

Within the environment shown in FIGS. 1A and 1B, one or more STAs 106 may associate and/or communicate with the AP 104 to join the WLAN. Joining the WLAN may enable STAs 106 to wirelessly communicate with each other via AP 104, with each other directly, with the AP 104, or to another network or resource through the AP 104. In some configurations, to send data to a recipient, a sending STA may transmit an Uplink (UL) Physical Layer Convergence Procedure (PLCP) Protocol Data Unit (PPDU) comprising the data, to AP 104, which may then send the data to the recipient STA 106, in a Downlink (DL) PPDU. The PLCP is the physical layer protocol that is used with 802.11 and other standards.

In some configurations, a frame of data transmitted between the STAs 106 or between a STA 106 and the AP 104 may be configurable. For example, a channel used for communication may be divided into subchannels that may be 20 MHz, 40 MHz, or 80 MHz, 160 MHz, 320 MHz of contiguous bandwidth or an 80+80 MHz (160 MHz) of non-contiguous bandwidth. Further, the bandwidth of a subchannel may be incremented into 1 MHz, 1.25 MHz, 2.03 MHz, 2.5 MHz, 5 MHz and 10 MHz bandwidths, or a combination thereof, or another bandwidth division that is less or equal to the available bandwidth may also be used. The bandwidth of the subchannels may be based on a number of active subcarriers. The bandwidth of the subchannels can be multiples of 26 (e.g., 26, 52, 106, etc.) active subcarriers or tones that are spaced by 20 MHz. In some configurations, the bandwidth of the subchannels is 256 tones spaced by 20 MHz. In other configurations, the subchannels are a multiple of 26 tones or a multiple of 20 MHz. A 20 MHz subchannel may also comprise 256 tones for use with a 256 point Fast Fourier Transform (FFT).

When managing access to the wireless medium in the WLAN, the AP 104 may schedule medium access, for the sending STA 106, during a UL time interval, during which the AP 104 may refrain from transmitting over the wireless medium. The UL time interval may comprise a portion of a Transmit Opportunity (TXOP) owned by AP 104.

At a given point in time, multiple STAs, in the WLAN, may wish to send data. In some configurations, rather than scheduling medium access for STAs 106 in different respective UL time intervals, the AP 104 may schedule medium access for STAs 106 to support UL MU transmission techniques, according to which multiple STAs 106 may transmit UL MU PPDUs to the AP 104 simultaneously during a given UL time interval. For example, by using UL MU OFDMA techniques during a given UL time interval, multiple STAs 106 may transmit UL MU PPDUs to the AP 104 via different respective OFDMA Resource Units (RUs) allocated by the AP 104. In another example, by using UL MU-MIMO techniques during a given UL time interval, multiple STAs 106 may transmit UL MU PPDUs to the AP 104 via different respective spatial streams allocated by the AP 104.

To manage access, the AP 104 may transmit a HE master-sync transmission, which may be a Trigger Frame (TF) or a control and schedule transmission, at the beginning of the control period. The AP 104 may transmit a time duration of the TXOP and sub-channel information. During the control period, STAs 106 may communicate with the AP 104 in accordance with a non-contention based multiple access technique, such as OFDMA or MU-MIMO. This technique is unlike conventional WLAN communications in which devices communicate in accordance with a contention-based communication technique, rather than a multiple access technique. During the control period, the AP 104 may communicate with stations 106 using one or more control frames, and the STAs 106 may operate on a sub-channel smaller than the operating range of the AP 104.

During the master-sync transmission, the STAs 106 may contend for the wireless medium with the legacy STAs 106 being excluded from contending for the wireless medium during the master-sync transmission. The TF used during this master-sync transmission may indicate an UL-MU-MIMO and/or UL OFDMA control period. The multiple-access technique used during the control period may be a scheduled OFDMA technique, or alternatively, may be a TDMA technique, a Frequency Division Multiple Access (FDMA) technique, or a SDMA technique.

Similarly, STAs, in the WLAN, may need to receive data. Again, rather than scheduling medium access for STAs 106 in different respective DL time intervals, the AP 104 may schedule medium access for STAs 106 to support DL MU transmission techniques, according to which multiple STAs 106 may receive DL MU PPDUs from the AP 104 simultaneously during a given DL time interval. For example, by using DL MU OFDMA techniques during a given UL time interval, multiple STAs 106 may receive DL MU PPDUs from the AP 104 via different respective OFDMA RUs allocated by the AP 104. In another example, by using DL MU-MIMO techniques during a given DL time interval, multiple STAs 106 may receive DL MU PPDUs from the AP 104 via different respective spatial streams allocated by the AP 104.

To manage access, the AP 104 may transmit a master-sync transmission, which may be a TF or a control and schedule reception, at the beginning of the control period. The AP 104 may transmit a time duration of the Receive Opportunity (RXOP) and sub-channel information. During the control period, STAs 106 may communicate with the AP 104 in accordance with a non-contention based multiple access technique, such as OFDMA or MU-MIMO. During the control period, the AP 104 may communicate with stations 106 using one or more control frames, and the STAs 106 may operate on a sub-channel smaller than the operating range of the AP 104.

During the master-sync transmission, the STAs 106 may contend for the wireless medium with the legacy STAs 106 being excluded from contending for the wireless medium during the master-sync transmission. The TF used during this master-sync transmission may indicate an UL-MU-MIMO and/or UL OFDMA control period. The multiple-access technique used during the control period may be a scheduled OFDMA technique, or alternatively, may be a TDMA technique, FDMA technique, or a SDMA technique.

The AP 104 may also communicate with legacy stations and/or stations 106 in accordance with legacy IEEE 802.11 communication techniques. In some configurations, the AP 104 may also be configurable to communicate with stations 106 outside the control period in accordance with legacy IEEE 802.11 communication techniques, although this is not a requirement.

As shown in FIG. 1B, the scheduling of the medium can be affected by the presence of another AP 2d 104h/AP 1c 104c that is part of another ESS 100b/100a. A STA 106 can be associated with ESS 100a and communicating with AP 1c 104c. If both AP 1c 104c and AP 2d 104h are sending signals on the same RUs at the same time, then the STA 106 may experience collisions or interference that prevents the successful reception of a signal from AP 1C 104c. Thus, AP 1c 104c could use information about AP 2d 104h to adjust the scheduling of DL transmissions to the STA 106, and vice versa.

Figure 2:
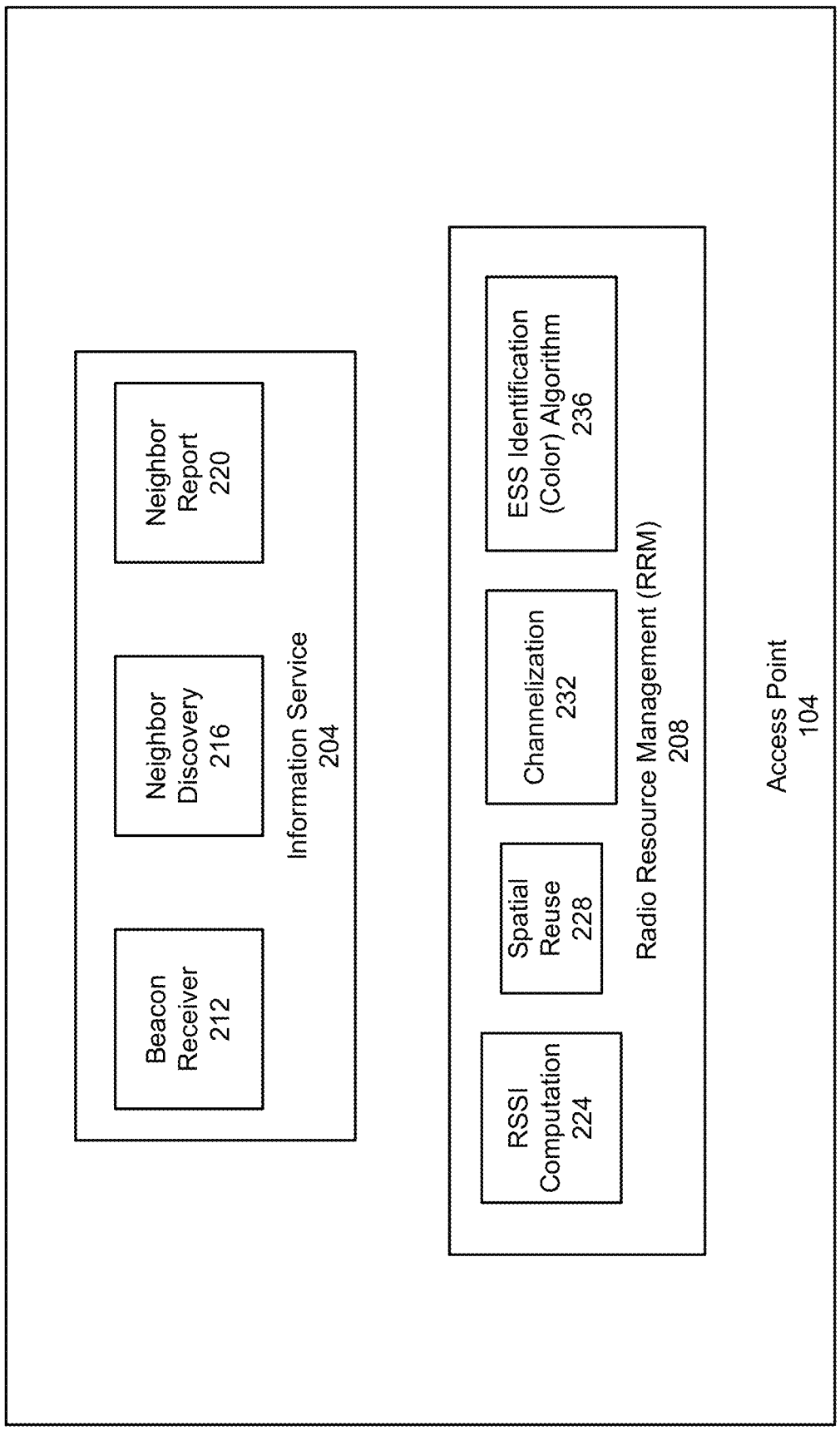
FIG. 2 illustrates an access point in accordance with aspects of the current disclosure.

An example for an AP 104 may be as shown in FIG. 2. The AP 104 can be embodied in hardware, software, or a combination of hardware and software. An example architecture of the AP 104 may be as described in conjunction with FIG. 9. The AP 104 can include an information service 204 and/or a RRM component 208. The information service 204 can include one or more of, but it is not limited to, a beacon receiver 212, a Neighbor Discovery (ND) component 216, and/or a neighbor report component 220. The beacon receiver 212 is operable to receive one or more beacons from an AP 104 in a different ESS 100b. For example, AP 1a 104a may receive beacons from AP 2d 104h. The beacons may have additional information about AP 2d 104h allowing for neighbor calculations in AP 1a 104a and/or allowing AP 1a 104a to inform AP 1c 104c of the presences of AP 2d 104h. The beacon sent from the AP 2d 104h may be as understood in the art but can include further information as described hereinafter in conjunction with data structure 404 in FIG. 4A or data structure 454 in FIG. 4B.

ND component 216 can conduct communications or extract information about one or more neighbors of AP 1a 104a. The ND component 216 may be operable to put information in beacons to be broadcast, may put ND information in FILS discovery frames, place ND information in MAC frames, or receive such information from those various sources and/or signals. The ND component 216 may then provide such information to the RRM component 208.

A neighbor report component 220 can receive a NR or RNR from another AP 104 that may be within range. For example, AP 1a 104a is within range of AP 2d 104h, as shown in FIG. 1B. These two APs 104 may exchange NRs or RNRs. AP 1a 104a may then provide such information to AP 1c 104c. This information from the neighbor report component 220 may also be reported to the RRM component 208.

The RRM component 208 can include one or more of, but is not limited to, an RSSI computation component 224, a spatial reuse component 228, a channelization component 232, and/or a color algorithm component 236. There may be more or fewer components provided in radio resource management 208. Further, RRM component 208 can include existing functions or components used in conducting radio resource management and/or other functions used to mitigate or eliminate interference between two APs 104. The RRM component 208 of AP 1c 104c can consider the information received from a separate AP 1a 104a and conduct RRM to compensate for the presence of the AP 2d 104h that is within range of a station 106 but not necessarily within range of the AP 1c 104c. The RRM component 208 can also communicate through a controller 101a, with a separate controller 101b, or directly with an AP 2d 104h to conduct joint RRM functions or operations to eliminate interference.

The RSSI computation component 224 can calculate or compute an adjusted RSSI for the AP 104 to compensate or to address interference from an interfering AP, e.g., AP 2d 104h, in a separate or different ESS 100b. The RSSI computations may be described hereinafter in conjunction with FIG. 5. In some circumstances, how the RSSI may be calculated is based on how the neighbor information about the interfering APs and/or other BSSs is received. Thus, a metric calculation, which can be an RSSI computation, may be different for the type or amount of information received, which may be different if the information is received in a beacon, an FILS frame, a MAC frame, or from an NR or RNR.

Spatial reuse component 228 can indicate or determine opportunities for spatial reuse based on information provided in the information about the interfering AP. Spatial reuse processes may be as understood or provided in one or more 802.11 protocols, however, in this situation, may also include, in the calculation determination, the information about the interfering AP, for example, AP 2d 104h, in the separate or different ESS 100b. Thus, the spatial reuse computation, while similar, includes further information not used previously to determine the ability for spatial reuse.

Similarly, the channelization component 232 may conduct similar processes as previous 802.11 systems. However, those previous systems did not account or factor in in their determinations the interfering AP in a separate ESS 100b, not known to the AP 104. However, the channelization component 232 can use the information received, as described in conjunction with FIG. 6 through FIG. 8, to determine channels used by the interfering AP for communications with or at STA 106. Further, the channelization component 232 may be managed jointly with or communicated to controller 2 101b or AP 2d 104h. As such, the AP 1c 104c can ensure that the interference experienced at the STA 106 may be mitigated or eliminated by the channelization component 232.

Similarly, the BSS coloring algorithm may also take into account the presence of an interfering AP. The color algorithm component 236 can determine an identifier for the BSS 100a and may coordinate such identification with ESS 100b through controllers 101a and 101b, or through APs 104. In this way, the ESSs 100a and 100b may select ESS identifiers or colors that are different and can be used to help STAs 106 to identify the source ESS of an incoming signal easily.

Figure 3:
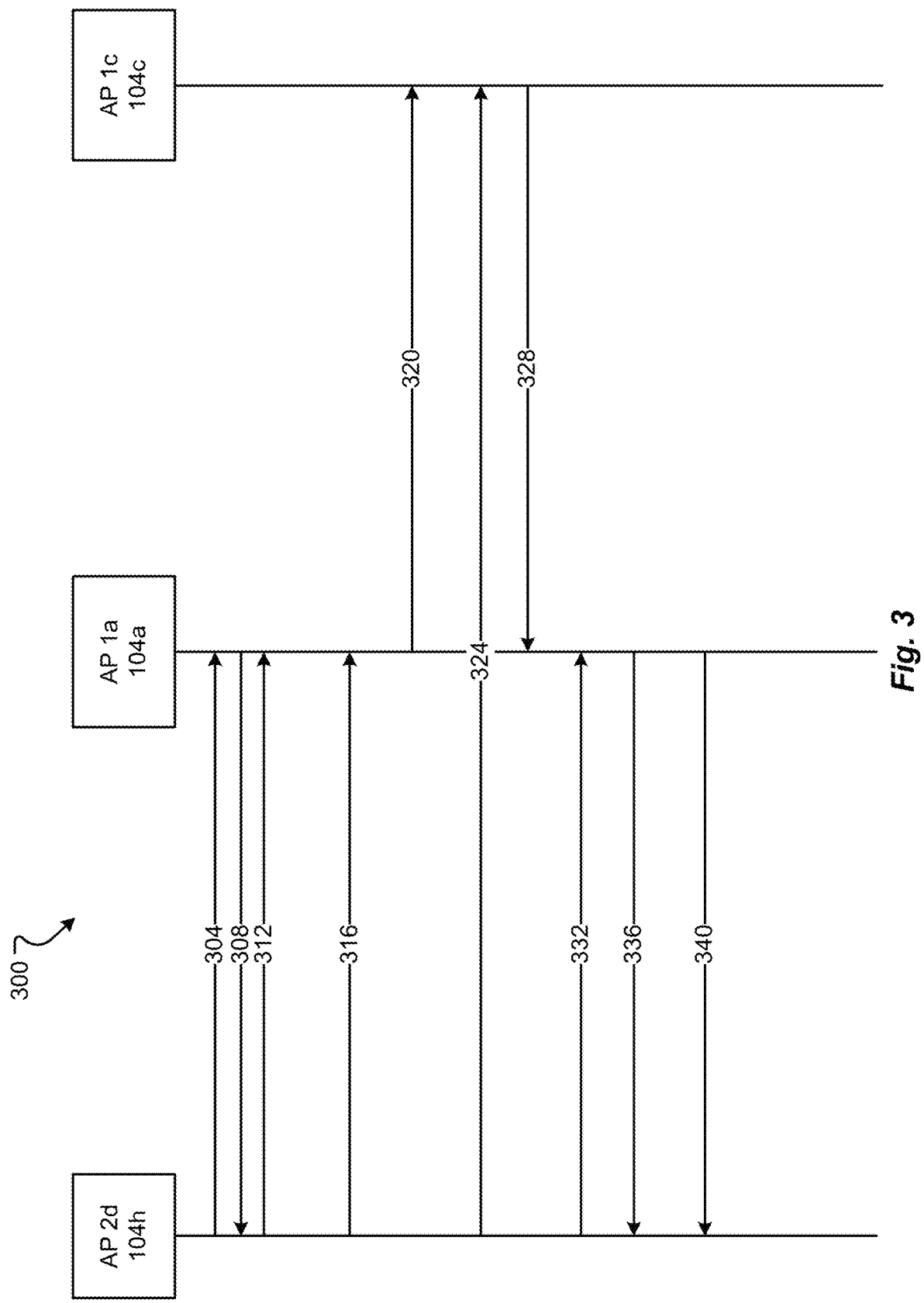
FIG. 3 illustrates a signaling process in accordance with aspects of the current disclosure.

An embodiment of a signaling process for exchanging communications between one or more APs 104h, 104a, and/or 104c may be as shown in FIG. 3. Signaling processes 300 can be conducted wirelessly or through wired connections between controllers 101a to 101b, between APs 104 and controllers 101, and/or APs 104, and vice versa. Any of these signals herein may be encrypted.

AP 2d 104h may send a signal 304. The signal may have information as described in data structure 404, as described in conjunction with FIG. 4A. This signal may be received by AP 104a, in a separate ESS, from AP 2d 104h. Upon receiving the signal 304, the AP 1a 104a may send a signal 308 back to AP 104h to request more information from the AP 104h. In this way, if the signal 304 does not have information needed from AP 104h to conduct RRM procedures that account for neighbors, the AP 104a can request the information from the AP 104h. Upon receiving the signal 308 at AP 104h, AP 104h may then send another frame of data or other information within signal 312 back to AP 104a. The signal 312 can also include the information as described in data structure 404 in FIG. 4A. In still other situations, AP 104h may send a neighbor report or a reduced neighbor report in signal 316. The NR or RNR may contain information from data structure 454, as described in conjunction with FIG. 4B.

Regardless of the source of the information about AP 104h, AP 104a may then forward that information or send it in neighbor information to another AP 104c in the same ESS, in signal 320. In this way, in the AP 104h from a separate ESS that may be interfering with transmissions to a station from AP 104c may be determined or found by AP 104a and then information about such interference may be provided to AP 104c. In still other situations, the AP 104c may receive the NR or RNR directly from AP 104h, in signal 324. Similarly, signal 324 can include the information in data structure 454 as described in conjunction with 4B. In this way, AP 104c can conduct radio resource management processes with the information whether from AP 104a or directly from AP 104h.

In another configuration, AP 1a 104a can inform AP 2d 104h of the presence of AP 1c 104c, which is in the same ESS as AP 1a 104a. AP 1a 104a can receive or observe information about AP 1c 104c. This information may be as described in data structure 404. Thereinafter, AP 1a 104a can receive a beacon or a FILS signal, as signal 332, from AP 2d 104h, which is part of another ESS. The beacon or other signal 332 may indicate that the AP 2d 104h advertises an open SSID. The AP 1a 104a can associate with the open SSID—acting as a client device—, in signal 336. With the association, or as a separate signal 340, the AP 1a 104a can send a beacon report to AP 2d 104h in a MAC frame or other data frame or construction. The beacon report can include the information about AP 1c 104c as described in conjunction with FIG. 4A. The AP 1a 104a may alternatively broadcast, if not able to send a more detailed information packet or different signal, for example, a NR or and RNR to the AP 2d 104h. The NR or RNR may be as described in conjunction with FIG. 4B. In this way, AP 1a 104a can broadcast data frames that may be received by AP 2d 104h to provide information to AP 2d 104h, in a different ESS, of the presence of AP 1c 104c.

Figure 4A:
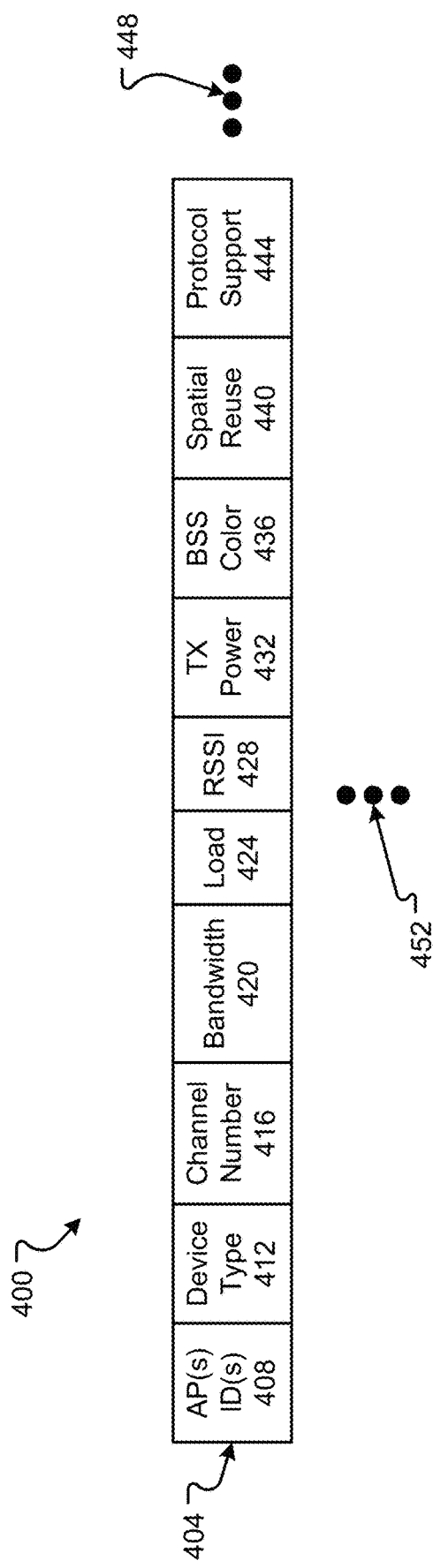
FIG. 4A illustrates data structure that may be received, stored, retrieved, managed, etc., in accordance with aspects of the current disclosure.
Figure 4B:
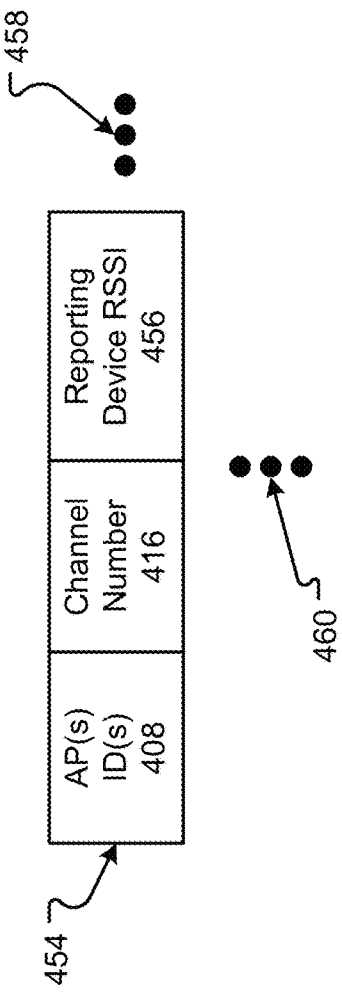
FIG. 4B illustrates another data structure that may be received, stored, retrieved, managed, etc., in accordance with aspects of the current disclosure.

Embodiments or aspects of information that may be sent, received, stored or managed within the system or one or more ESSs 100 may be as shown in FIGS. 4A and 4B. The information 400 can be stored in data storage, databases, or other types of storage systems. Further, the information 400 can also be sent in one more signals as described in conjunction with FIG. 3.

An embodiment of one or more items of information that may be provided in a data structure 404 that's transmitted in signals described in conjunction with FIG. 3 or stored in other systems or data storage may be shown in FIG. 4A. Data structure 404 can include one or more of, but is not limited to, an AP identifier (ID) 408, device type 412, channel number 416, bandwidth 420, load 424, RSSI 428, transmit power 432, BSS color or identifier 436, spatial reuse information 440, and/or product or support 444. There may be more or fewer fields in data structure 404 as represented by . . . 448. Each type of AP or transmission between APs of different ESSs may include a data structure 404 as represented by ellipses 452.

An AP ID 408 can include any type of identifier for an AP 104. For example, the AP ID 408 can include one or more of, but is not limited to, a numeric ID, an alphanumeric ID, a Globally Unique Identifier (GUID), a Uniform Resource Locator (URL), a MAC address, or some other type of identifier that uniquely identifies the AP 104 amongst other APs in the ESS 100a and/or ESS 100b.

Device type 412 can indicate whether the device sending or receiving signals is an AP 104, a sensor, etc. A sensor may be used to determine if there is interference from an AP 104h in another ESS 100b. Thus, the device type 412 can indicate what type of device is being used to determine the information about the AP 104h in the other ESS 100b.

A channel number 416 can be the channel number or channel assignment used for transmission and/or reception by the other AP 104h. This channel number 416 can have an identifier, for example, 1, 6, or 11, that identifies the channel. In some configurations where the AP 104, STA 106, etc. provide 5G connectivity, the channel information can include 5G License Assisted Access (LAA) channels.

Bandwidth 420 can indicate the amount of bandwidth being used or to be used by the AP 104h. This bandwidth can be indicated in megabits per second or some other type of measure the amount of bandwidth 420 needed by the AP 104h. As above where, where the AP 104, STA 106, etc. provide 5G connectivity, the bandwidth information can include 5G bandwidth information also.

The load 424 can indicate the number of streams or STAs 106 being serviced by the AP 104h. The load 424 can also be a future amount of bandwidth or streams that may be sent or received by the AP 104h. Thus, the load 424 can help determine the ability for the AP 104h to reduce or need to increase the amount of transmissions and how best to manage the radio resource with that AP 104h.

The RSSI 428 may be either an indication of the amount of signal strength received at an AP 104a or AP 104c and/or an indication, sent from the transmitting AP 104h, as to the amount of signal strength being used to transmit. Either of these measures may be used for RRM information including the interference that might be created by that AP. The RSSI may be used in the equations, computations, etc., described above in conjunction with FIG. 5.

The transmit power 432 can be an indication from the transmitting AP 104h of the amount of power being used to transmit. The transmit power 432 can give an indication of distance from the current AP 104c based on the amount of signal strength received and recorded in the RSSI 428. In this way, it may be possible to ignore certain APs if those APs may be at a greater distance and cannot cause or cause little interference.

The BSS color identifier 436 (also referred to simply as a BSS color) can be an identifier of the BSS to which the AP belongs. The BSS color 436 can be one or more of, but is not limited to, a numeric ID, an alphanumeric ID, a GUID, or other type of identifier that identifies the BSS 100a, 100b amongst all other BSSs. The BSS color identifier 436 can be provided to indicate to which BSS that AP 104h is part and to identify the controller 101 associated with that BSS.

Spatial reuse information 440 can include any type of indication of the ability to reuse the bandwidth in the environment. Thus, this spatial reuse information 440 may be an indication of the ability to use similar spatial transmissions based on the use by the foreign unassociated AP 104h.

Protocol support 444 can include any type of information or indication of what protocols may be supported by the APs 104. These protocols may include any type of negotiations by neighbors or different BSSs or ESSs for determining or provisioning the radio resource, especially in environments where interference is possible. The protocol support 444 allows the AP 104c to determine how best to communicate with the AP 104h or controller 101b and the other ESS 100b.

Another data structure 454 which may be a representation of the neighbor report or the reduced neighbor report may be as shown in FIG. 4B. The data structure 454 can include one or more fields, but it is not limited to, an AP ID 408, a channel number 416, and a reporting device RSSI 456. There may be more or fewer fields in data structure 454 as represented by ellipses 458. Further, each device or AP 104 that provides such neighbor reports may have a different neighbor report which may be represented by ellipses 460.

The AP ID 408 and the channel number 416 may be the same or similar to that data described in conjunction with FIG. 4A and will not be described further here. The reporting device RSSI 456 can be the amount of signal strength produced or received by the AP 104c from AP 104h. The reporting device RSSI 456 can be a small bit of information and may be used in the RSSI calculations as described in conjunction with FIG. 5. Signal strength can be represented in the watts or some other type of measure.

Figure 5:
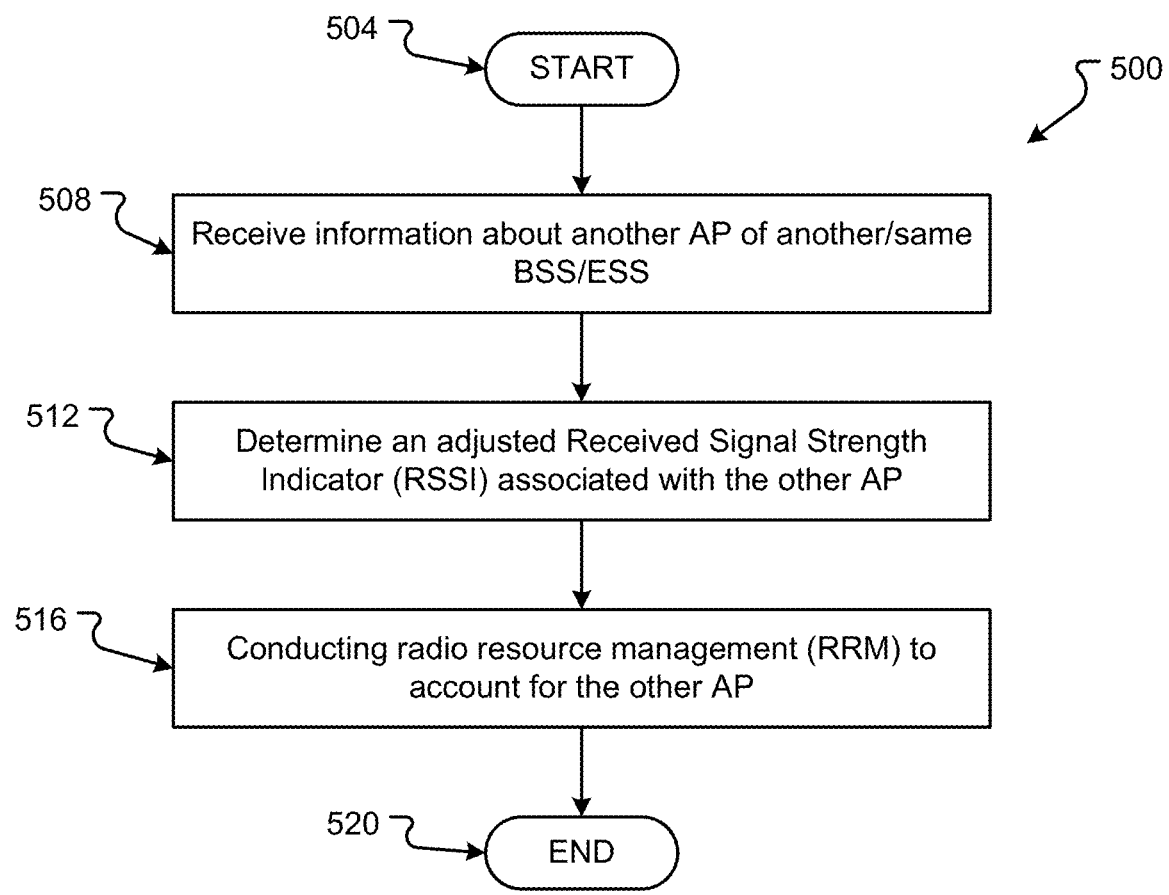
FIG. 5 illustrates a process for determining a RSSI of another AP in accordance with aspects of the current disclosure.

A method 500 for conducting RRM to account for an AP 2D 104h/AP 1C 104c from another BSS and/or ESS 100b may be as shown in FIG. 5. Generally, the method 500 starts with a start operation 504 and ends with an end operation 520. The method 500 can include more or fewer steps or can arrange the order of the steps differently than those shown in FIG. 5. The method 500 can be executed as a set of computer-executable instructions, executed by a computer system or processing component, and be encoded or stored on a storage medium. Further, the method 500 can be executed by a gate or other hardware device or component in an ASIC, a FPGA, or other type of hardware device. Hereinafter, the method 500 shall be explained with reference to the systems, components, modules, software, data structures, etc. described herein.

A first AP 2d 104h (or AP 1c 104c) may receive information about another AP, for example, AP 1c 104c (or AP 2D 104h), of another ESS 100a (or ESS 100b) (as shown in FIG. 1A), in stage 508. The information about the AP 1c 104c or AP 2D 104h, in the same ESS 100a or different ESS 100b, may be received through one or more different processes. Examples of the several processes may be as described in conjunction with FIG. 6 through FIG. 8. The information can include one or more of the items of information included in data structures 404 or 454 described in conjunction with FIGS. 4A and 4B. The information may be provided either to AP 2d 104h or as one or more signals as described in conjunction with FIG. 3. The AP 2d 104h or AP 1c 104c can receive information with the information service 204 either at the beacon receiver 212, the ND component 216, or the neighbor report component 220. The various information provided may then be provided to the radio resource management component 208 of AP 2d 104h or AP 1c 104c to avoid signal collisions with AP 1c 104c or AP 2D 104h.

The radio resource management component 208 can then determine an adjusted RSSI associated with AP 1c 104c/AP 2d 104h, in stage 512. The RSSI computation component 224 can receive the RSSI information and/or other information about the other AP 1c 104c/AP 2d 104h and use that information to compute an adjusted RSSI. The RSSI information can include the RSSI information in field 428 or in field 456. The adjusted RSSI can be computed based on the one or more algorithms that are applied based on how the information is received or the type of RSSI information. For example, if the information received is in the beacon report, FILS frame, MAC frame, etc., the information includes data in data structure 404, and/or is received as described in conjunction with FIGS. 6 and 7, then the following formula may be used to calculate the adjusted RSSI:

$$RSSI_{adj} = RSSI_{reported}\ RSSI_{reporting\ device} - RSSI_{reference}$$

The adjusted RSSI takes the place of the RSSI inputs in various RRM calculations or determinations. The "reported RSSI" references the RSSI, of the AP 1c 104c/AP 2d 104h, received and calculated at the AP 1a 104a and which is sent to AP 1c 104c/AP 2D 104h. The "reporting RSSI" represents the RSSI received at the AP 1c 104c associated with AP 1a 104a. The "reference RSSI" is a constant value that is associated with the reporting AP 1a 104a or with this type of calculation. If the adjusted RSSI is not above a predetermined threshold, the neighbor AP 1c 104c/AP 2d 104h may be ignored as being too far to cause interference. The inclusion of the reporting AP's RSSI ensures that if the AP 1a 104a is too far, its neighbors will also be ignored.

Figure 8:
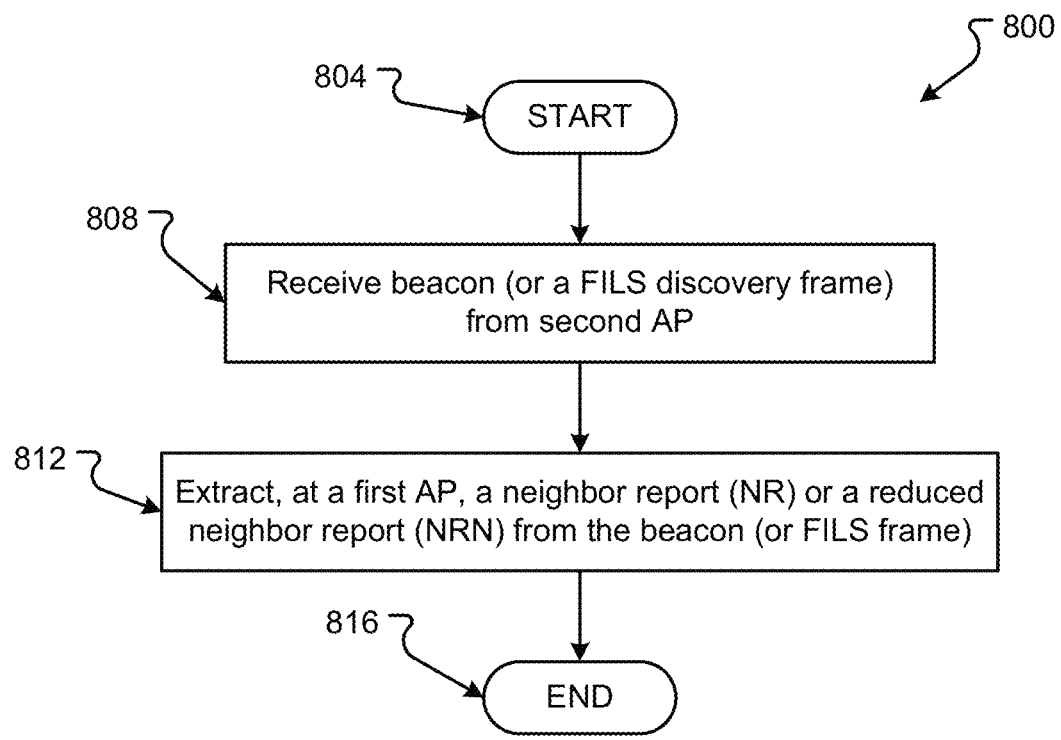
FIG. 8 illustrates another method for receiving information about another AP that may be causing interference in accordance with aspects of the current disclosure.

If the information received is in a neighbor report or a RNR, the information can include the information in data structure 454, and/or is received as described in conjunction with FIG. 8, then the following formula may be used to calculate the adjusted RSSI:

$$RSSI_{adj} = RSSI_{reporting\ device} - \text{Adjustment Factor}$$

Again, this adjusted RSSI takes the place of the RSSI inputs in various RRM calculations or determinations. The "reporting device RSSI" represents the RSSI received at the AP 2d 104h/AP 1c 104c associated with AP 1a 104a. The "Adjustment Factor" is a constant value that is associated with the reporting AP 1a 104a or with this type of calculation. Again, if the adjusted RSSI is not above a predetermined threshold, the neighbor AP 1c 104c/AP 2d 104h may be ignored as being too far to cause interference because the AP 1a 104a is too far.

With the adjusted RSSI, the RRM component 208 may then conduct other functions for radio resource management to account for the other AP 1c 104c/AP 2d 104h, in stage 516. In stage 516, the spatial reuse component 228 can determine spatial reuse opportunities in the environment including determinations of spatial reuse based on the other ESS 100b or BSS and the AP 1c 104c/AP 2d 104h that may be causing interference with the station 106 in communication with the AP 1c 104c/AP 2d 104h. The spatial reuse component 228 may function to determine spatial reuse as understood in the 802.11 protocols, but may use the adjusted RSSI versus computation.

Further the channelization or determination of a channel to use in communication with station 106 may also be computed by the channelization component 232 with the adjusted RSSI. Still further, the determination of the BSS color used with BSSs in ESS 100a and 100b may also be determined based on the adjusted RSSI or in reaction to determining an adjusted RSSI over a particular threshold. Thus, the normal functions of the radio resource management component 208 conducted in determining how to communicate with the station 106 or how to communicate with the other BSS may be influenced or directed by the adjusted RSSI or by the determination of the presence of a secondary AP 1c 104c/AP 2d 104h that may be causing interference with a station 106 or causing other issues with the BSS.

Figure 6A:
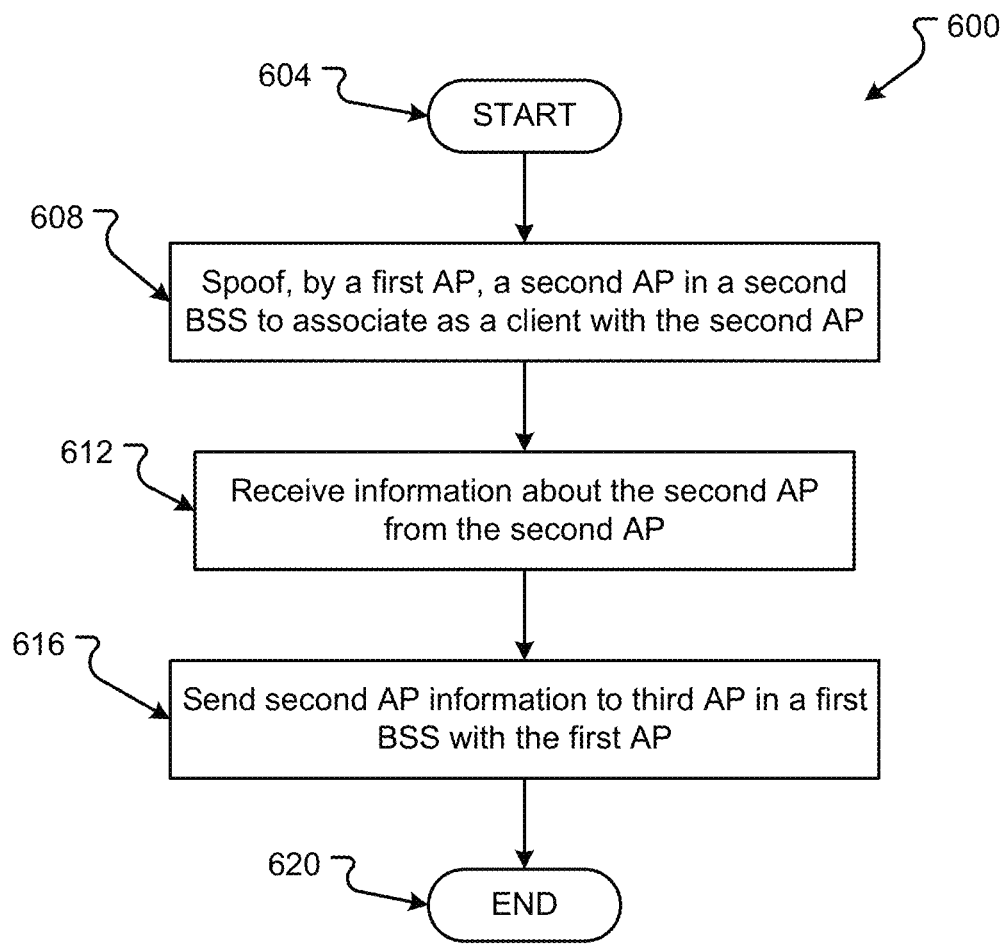
FIG. 6A illustrates a method for receiving information about another AP that may be causing interference in accordance with aspects of the current disclosure.

A method 600 for receiving information about AP 2d 104h in another ESS 100b may be as shown and described in FIG. 6A. Generally, the method 600 starts with a start operation 604 and ends with an end operation 620. The method 600 can include more or fewer steps or can arrange the order of the steps differently than those shown in FIG. 6A. The method 600 can be executed as a set of computer-executable instructions, executed by a computer system or processing component, and be encoded or stored on a storage medium. Further, the method 600 can be executed by a gate or other hardware device or component in an ASIC, a FPGA, or other type of hardware device. Hereinafter, the method 600 shall be explained with reference to the systems, components, modules, software, data structures, etc. described herein.

A second AP, AP 1a 104a, may spoof a first AP, AP 2d 104h, which is part of another ESS 100b, to associate with AP 2d 104h as a client, in stage 608. In some situations, a sensor instead of AP 1a 104a will spoof as a client and perform the stages described herein in conjunction with FIG. 6. However, for ease of description, the AP 104a will be described as conducting the following process. AP 2d 104h may have an open SSID. The AP 1a 104a may receive beacons or other indications of the open SSID of AP 2d 104h, in signals 304. The AP 1a 104a may then associate with the first AP 2d 104h through the open SSID by sending signal 308 to AP 2d 104h.

In response to the request to associate as a client, AP 2d 104h may then send a next signal 312 back to AP 104a. This signal 312 may include information about the first AP 2d 104h which is received by AP 104a, in stage 612. The information provided may include the information in data structure 404 as described in conjunction with FIG. 4A. The information may be included in a MAC frame or other type of signal. This information may be received by the information service 204 of AP 104a.

Information about AP 104h may be extracted and provided in signal 320 to a third AP 104c sent by the AP 104a to AP 104c, in stage 616. AP 104c may require the neighbor information contained in data structure 404 to compensate the presence of AP 2d 104h. AP 104h may not be within range of AP 1c 104c but is within range of AP 104a. However, a station 106 between AP 1c 104c and AP 2d 104h may experience interference from AP 2d 104h. As such, the information service 204 may receive the information at the ND component 216 to perform the steps of determining an adjusted RSSI and conducting other RRM processes as described in conjunction with FIG. 5.

Figure 6B:
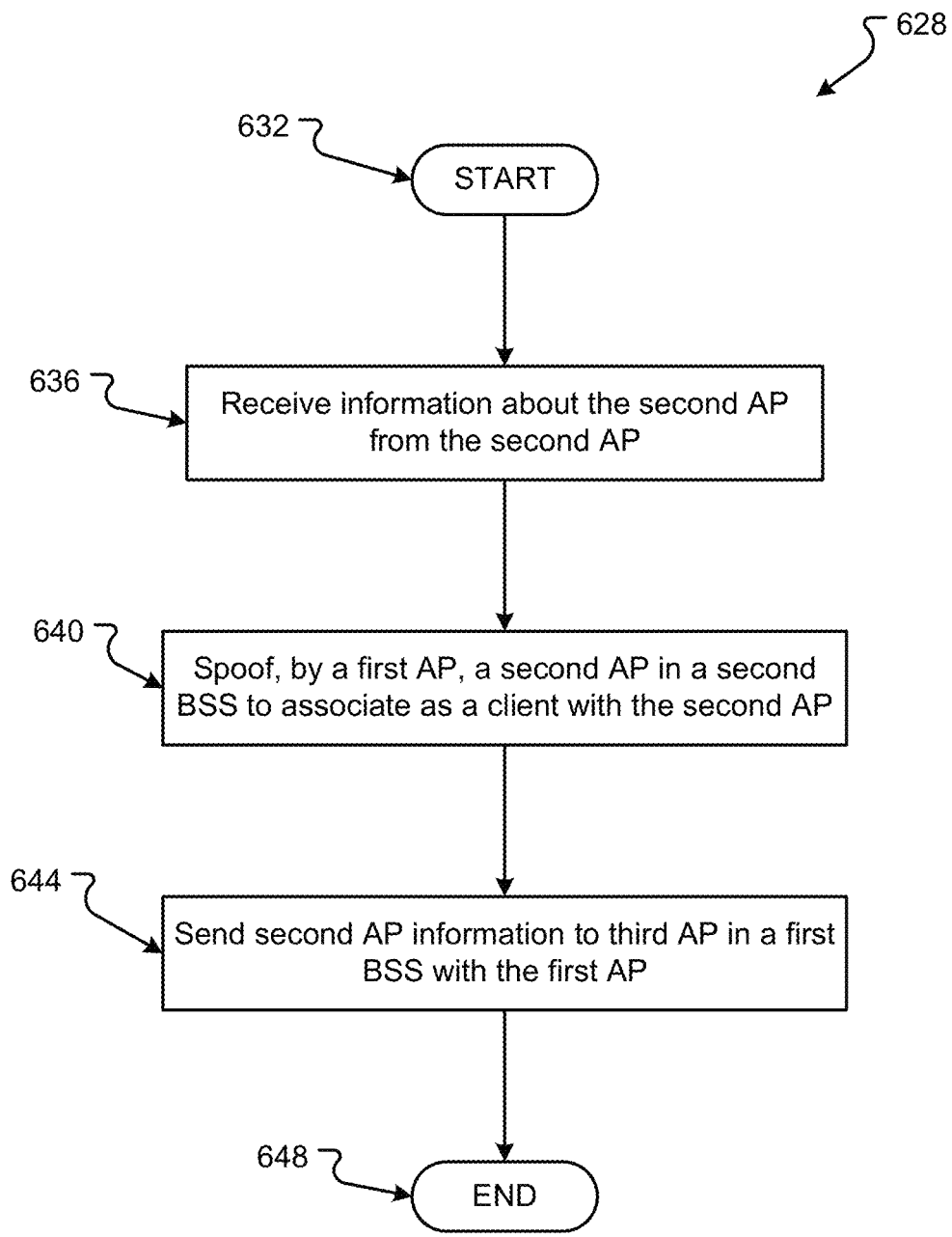
FIG. 6B also illustrates a method for receiving information about another AP that may be causing interference in accordance with aspects of the current disclosure.

A method 628 for sending information about AP 1c 104c, in a second ESS 100b and having a second BSS color, may be as shown and described in FIG. 6B. Generally, the method 628 starts with a start operation 632 and ends with an end operation 648. The method 628 can include more or fewer steps or can arrange the order of the steps differently than those shown in FIG. 6B. The method 628 can be executed as a set of computer-executable instructions, executed by a computer system or processing component, and be encoded or stored on a storage medium. Further, the method 628 can be executed by a gate or other hardware device or component in an ASIC, a FPGA, or other type of hardware device. Hereinafter, the method 628 shall be explained with reference to the systems, components, modules, software, data structures, etc. described herein.

A second AP, AP 1c 104c, may send or provide information about the AP 2d 104h to a third AP, AP 1a 104a. The AP 1a 104a can receive the information, in stage 636. For example, AP 1a 104a can receive information in data structure 404, as described in conjunction with FIG. 4A. The information may be sent to AP 1a 104a, by AP 1c 104c, in signal 328. The information may be included in a MAC frame or other type of signal. This information may be received by the information service 204 of AP 104a.

A second AP, AP 1a 104a, may spoof a first AP, AP 2d 104h, which is part of another ESS 100b, and may have a different BSS color, to associate with AP 2d 104h as a client, in stage 640. In some situations, a sensor instead of AP 1a 104a will spoof as a client and perform the stages described herein in conjunction with FIG. 6B. However, for ease of description, the AP 104a will be described as conducting the following process. AP 2d 104h may have an open SSID. The AP 1a 104a may receive beacons or other indications of the open SSID of AP 2d 104h, in signals 304. The AP 1a 104a may then associate with the first AP, AP 2d 104h, through the open SSID by sending signal 308 to AP 2d 104h.

Information about AP 1c 104c may be extracted and provided in signal 320, to the first AP, AP 2d 104h, sent by the AP 104a to AP 104c, in stage 644. AP 2d 104h may require the neighbor information contained in data structure 404 to compensate for the presence of AP 1c 104c. AP 104h may not be within range of AP 1c 104c but is within range of AP 104a. However, a station 106 between AP 1c 104c and AP 2d 104h may experience interference from AP 1c 104c. As such, the information service 204 may receive the information at the ND component 216 to perform the steps of determining an adjusted RSSI, BSS color, etc., and conducting other RRM processes as described in conjunction with FIG. 5.

Figure 7:
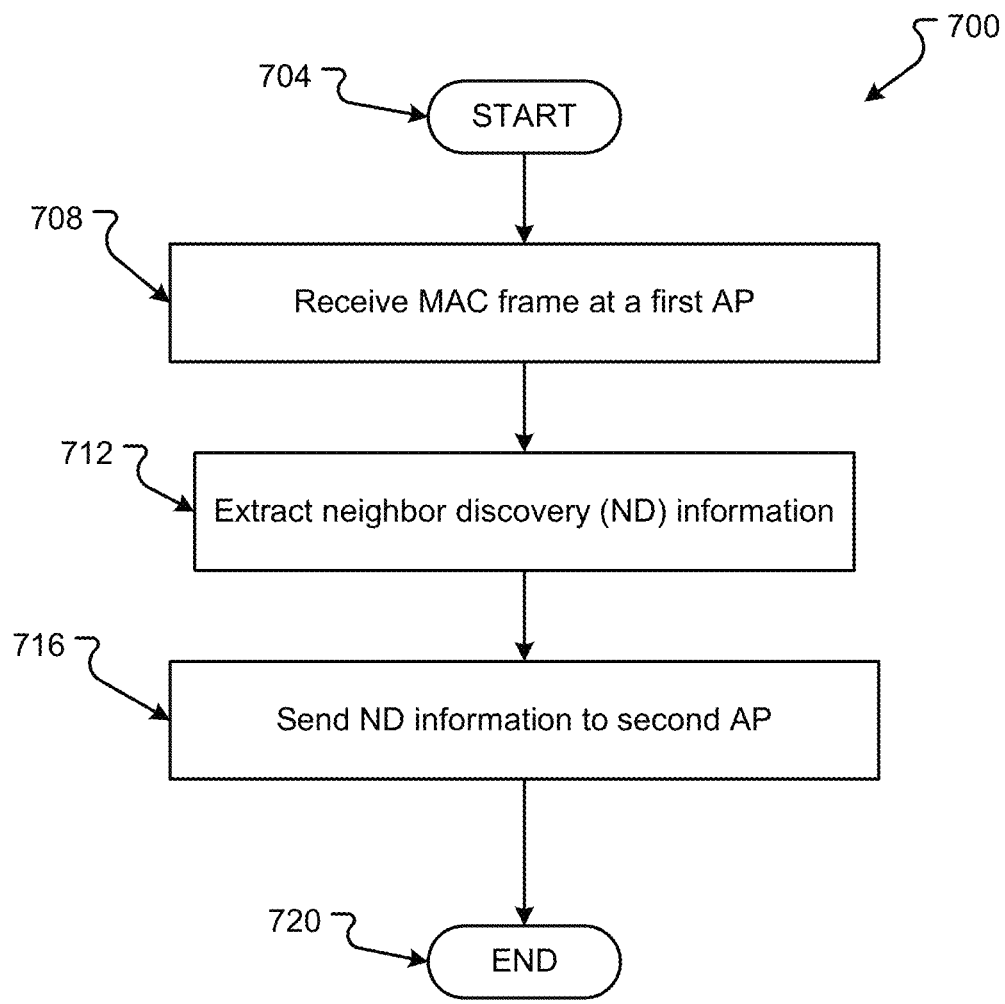
FIG. 7 illustrates another method for receiving information about another AP that may be causing interference in accordance with aspects of the current disclosure.

A method 700 for receiving a MAC frame with neighbor information may be as described in conjunction with FIG. 7. Generally, the method 700 starts with a start operation 704 and ends with an end operation 720. The method 700 can include more or fewer steps or can arrange the order of the steps differently than those shown in FIG. 7. The method 700 can be executed as a set of computer-executable instructions, executed by a computer system or processing component, and be encoded or stored on a storage medium. Further, the method 700 can be executed by a gate or other hardware device or component in an ASIC, a FPGA, or other type of hardware device. Hereinafter, the method 700 shall be explained with reference to the systems, components, modules, software, data structures, etc. described herein.

A second AP 1a 104a may receive a MAC frame from an AP, e.g., AP 2d 104h or AP 1c 104c, in stage 708. The MAC frame may be received in response to spoofing the AP 2d 104 has described in conjunction with FIG. 6A or may be received through other processes. The MAC frame can contain information as described in conjunction with data structure 404 of FIG. 4A. The information service 204 of AP 104a can receive the MAC frame to extract information for another AP, e.g., AP 2d 104h or AP 1c 104c. The first AP, e.g., AP 2d 104h, may be part of a different ESS, e.g., ESS 100b, and possibly may be causing interference with a station 106 in communication with AP 1c 104c and/or AP 2d 104h.

The information service 204 of AP 1a 104a may then extract any ND information or other types of information about the other AP, e.g., AP 2d 104h or AP 1c 104c, from data structure 404, in stage 712. For example, the information service 204 can extract the device type 412, channel number 416, bandwidth 420, load 424, RSSI 428, transmit power 432, BSS color identifier 436, spatially reuse information 440, protocol support information 444 from the data structure 404, which may be embodied in a MAC frame. This information may then be placed into a separate message.

The AP 104a can send the separate message with the ND information to a first AP, e.g., AP 2d 104h or AP 1c 104c, as signal 320, in stage 716. The signal 320 may be sent through a controller 101a or directly to the AP, e.g., AP 2d 104h or AP 1c 104c. In other configurations, the AP 1a 104a may spoof the other AP, e.g., AP 2d 104h, and/or send the neighbor information in another MAC frame to the receiving AP, e.g., AP 2d 104h or AP 1c 104c. In still other configurations, the AP 1a 104a can send the neighbor information in a broadcast frame (or a FILS frame or other data or signal construct) to the receiving AP, e.g., AP 2d 104h or AP 1c 104c This ND information may then be used by the AP, e.g., AP 2d 104h or AP 1c 104c to communicate with the other AP(s) to determine various RRM procedures, as described in conjunction with FIG. 5.

A method 800 for receiving information about AP, e.g., AP 2d 104h or AP 1c 104c, in a neighbor report or a reduced neighbor report may be as described in conjunction with FIG. 8. Generally, the method 800 starts with a start operation 804 and ends with an end operation 816. The method 800 can include more or fewer steps or can arrange the order of the steps differently than those shown in FIG. 8. The method 800 can be executed as a set of computer-executable instructions, executed by a computer system or processing component, and be encoded or stored on a storage medium. Further, the method 800 can be executed by a gate or other hardware device or component in an ASIC, a FPGA, or other type of hardware device. Hereinafter, the method 800 shall be explained with reference to the systems, components, modules, software, data structures, etc. described herein.

The information service 204, of AP 1c 104c or AP 1a 104a, can receive a beacon or a FILS discovery frame from a first AP 2d 104h, in stage 808. Thus, AP 1c 104c may be in some situations in direct contact with AP 2d 104h. In these situations, the AP 1c 104c can receive a beacon or FILS discovery frame directly from AP 2d 104h, in signal 324. The neighbor report component 220 can receive the information in beacon or FILS discovery frame to determine or extract neighbor report information.

The neighbor report component 220 extracts the neighbor report information in the NR or RNR from the beacon or FILS frame received in signal 324, in stage 812. This information may include the information shown in data structure 454 of FIG. 4B. Notably, the channel number 416 and reporting device RSSI 456 can be extracted and used for determining an adjusted RSSI, as described in conjunction with FIG. 5.

In other configurations, the information service 204, of AP 2d 104h, can receive a beacon or a FILS discovery frame from AP 1a 104a, in stage 808. Thus, AP 1a 104a and provide information about AP 1c 104c in a beacon of FILS frame. In these situations, the AP 2d 104h can receive a beacon or FILS discovery frame directly from AP 1a 104a, in signal 324. The neighbor report component 220 can receive the information in beacon or FILS discovery frame to determine or extract neighbor report information about AP 1c 104c.

The neighbor report component 220 extracts the neighbor report information in the NR or RNR from the beacon or FILS frame received in signal 324, in stage 812. This information may include the information shown in data structure 454 of FIG. 4B and associated with AP 1c 104c. Notably, the channel number 416 and reporting device RSSI 456 can be extracted and used for determining an adjusted RSSI, as described in conjunction with FIG. 5.

FIG. 9 illustrates an embodiment of a communications device 900 that may implement one or more of APs 104, controllers 101, and/or STAs 106 of FIG. 1. In various embodiments, device 900 may comprise a logic circuit. The logic circuit may include physical circuits to perform operations described for one or more of APs 104, controllers 101, and STAs of FIG. 1, for example. As shown in FIG. 9, device 900 may include one or more of, but is not limited to, a radio interface 910, baseband circuitry 920, and/or computing platform 930.

The device 900 may implement some or all of the structures and/or operations for one or more of APs 104, controllers 101, and/or STAs 106 of FIG. 1, storage medium 960, and logic circuit in a single computing entity, such as entirely within a single device. Alternatively, the device 900 may distribute portions of the structure and/or operations using a distributed system architecture, such as a client-server architecture, a peer-to-peer architecture, a master-slave architecture, etc.

An radio interface 910, which may also include an analog front end (AFE), may include a component or combination of components adapted for transmitting and/or receiving single-carrier or multi-carrier modulated signals (e.g., including Complementary Code Keying (CCK), orthogonal frequency division multiplexing (OFDM), and/or Single-Carrier Frequency Division Multiple Access (SC-FDMA) symbols) although the configurations are not limited to any specific over-the-air interface or modulation scheme. The radio interface 910 may include, for example, a receiver 912 and/or a transmitter 916. Radio interface 910 may include bias controls, a crystal oscillator, and/or one or more antennas 918. In additional or alternative configurations, the radio interface 910 may use oscillators and/or one or more filters, as desired.

Baseband circuitry 920 may communicate with radio interface 910 to process, receive, and/or transmit signals and may include, for example, an Analog-To-Digital Converter (ADC) for down converting received signals with a Digital-To-Analog Converter (DAC) 922 for up converting signals for transmission. Further, baseband circuitry 920 may include a baseband or PHYsical layer (PHY) processing circuit for the PHY link layer processing of respective receive/transmit signals. Baseband circuitry 920 may include, for example, a Medium Access Control (MAC) processing circuit 927 for MAC/data link layer processing. Baseband circuitry 920 may include a memory controller for communicating with MAC processing circuit 927 and/or a computing platform 930, for example, via one or more interfaces 934.

In some configurations, PHY processing circuit may include a frame construction and/or detection module, in combination with additional circuitry such as a buffer memory, to construct and/or deconstruct communication frames. Alternatively or in addition, MAC processing circuit 927 may share processing for certain of these functions or perform these processes independent of PHY processing circuit. In some configurations, MAC and PHY processing may be integrated into a single circuit.

The computing platform 930 may provide computing functionality for the device 900. As shown, the computing platform 930 may include a processing component 928. In addition to, or alternatively of, the baseband circuitry 920, the device 900 may execute processing operations or logic for one or more of APs 104, controllers 101, and/or STAs 106, storage medium 960, and logic circuits using the memory components 960. The processing component 928 (and/or PHY and/or MAC 927) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, Application Specific Integrated Circuits (ASIC), Programmable Logic Devices (PLD), Digital Signal Processors (DSP), Field Programmable Gate Array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, Application Program Interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 930 may further include other platform components. Other platform components include common computing elements, such as one or more processors, multi-core processors, co-processors, memory units, chipsets, controllers, peripherals, interfaces, oscillators, timing devices, video cards, audio cards, multimedia Input/Output (I/O) components (e.g., digital displays), power supplies, and so forth. Examples of memory units 960 may include without limitation various types of computer readable and machine readable storage media in the form of one or more higher speed memory units, such as Read-Only Memory (ROM), Random-Access Memory (RAM), Dynamic RAM (DRAM), Double-Data-Rate DRAM (DDRAM), Synchronous DRAM (SDRAM), Static RAM (SRAM), Programmable ROM (PROM), Erasable Programmable ROM (EPROM), Electrically Erasable Programmable ROM (EEPROM), flash memory, polymer memory such as ferroelectric polymer memory, ovonic memory, phase change or ferroelectric memory, Silicon-Oxide-Nitride-Oxide-Silicon (SONOS) memory, magnetic or optical cards, an array of devices such as Redundant Array of Independent Disks (RAID) drives, solid state memory devices (e.g., Universal Serial Bus (USB) memory, Solid State Drives (SSD) and any other type of storage media suitable for storing information.

Device 900 may be, for example, an ultra-mobile device, a mobile device, a fixed device, a Machine-To-Machine (M2M) device, a Personal Digital Assistant (PDA), a mobile computing device, a smart phone, a telephone, a digital telephone, a cellular telephone, user equipment, eBook readers, a handset, a one-way pager, a two-way pager, a messaging device, a computer, a Personal Computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 900 described herein, may be included or omitted in various embodiments of device 900, as suitably desired.

Embodiments of device 900 may be implemented using Single Input Single Output (SISO) architectures. However, certain implementations may include multiple antennas (e.g., antennas 918) for transmission and/or reception using adaptive antenna techniques for beamforming or Spatial Division Multiple Access (SDMA) and/or using MIMO communication techniques.

The components and features of device 900 may be implemented using any combination of discrete circuitry, Application Specific Integrated Circuits (ASICs), logic gates and/or single chip architectures. Further, the features of device 900 may be implemented using microcontrollers, programmable logic arrays and/or microprocessors or any combination of the foregoing where suitably appropriate. It is noted that hardware, firmware, and/or software elements may be collectively or individually referred to herein as "logic," "circuit," or "processor."

The device in FIG. 9 can also contain a security module (not shown). This security module can contain information regarding, but not limited to, security parameters required to connect the device to another device or other available networks or network devices, and can include Wireless Equivalent Privacy (WEP) or Wi-Fi Protected Access (WPA) security access keys, network keys, etc., as discussed.

Another module that the device in FIG. 9 can include is a network access unit (not shown). The network access unit can be used for connecting with another network device. In one example, connectivity can include synchronization between devices. In another example, the network access unit can work as a medium which provides support for communication with other stations. In yet another example, the network access unit can work in conjunction with at least the MAC circuitry 927. The network access unit can also work and interact with one or more of the modules/components described herein.

It should be appreciated that the exemplary device 900 shown in the block diagram of FIG. 9 may represent one functionally descriptive example of many potential implementations. Accordingly, division, omission, or inclusion of block functions depicted in the accompanying figures does not infer that the hardware components, circuits, software and/or elements for implementing these functions would be necessarily be divided, omitted, or included in embodiments.

What is claimed is:

1. A method comprising:
    receiving, at a first Access Point (AP), of a first Extended Service Set (ESS), and from a second AP of a second ESS, information about a third AP of the second ESS, wherein the information about the third AP, received by the second AP, is included in a Media Access Control (MAC) frame containing information associated with the third AP;
    based on the information about the third AP, determining, by the first AP, a metric associated with the third AP;
    based on the metric, conducting, by the first AP, Radio Resource Management (RRM) to account for the third AP;
    the first AP comparing the information associated with the third AP against a list of known neighbor APs; and
    if the list of known neighbor APs does not include the third AP, the first AP adding the third AP to the list for channelization and BSS color algorithms.

2. The method of claim 1, wherein the first AP could not detect a presence of the third AP.

3. The method of claim 2, wherein the second AP associates with an open service set identifier (SSID) of the first AP to notify the first AP of the third AP and provide information associated with the third AP.

4. The method of claim 3, wherein the second AP communicates with the first AP using an auxiliary radio.

5. The method of claim 3, wherein the information about the third AP is received in a beacon report at the first AP and from the second AP.

6. The method of claim 5, wherein the third AP is a cellular base station, wherein the second AP is managed by a same controller that manages the second ESS, and wherein the beacon report also includes 5G license assisted access (LAA) channels or bandwidth information of nearby 5G base stations.

7. The method of claim 1, wherein the ND information comprises one or more of a device type, a channel number, a bandwidth, a load, a received RSSI, a transmission power, BSS color, a number of spatial reuse opportunities, or protocol support.

8. The method of claim 1, wherein the metric is an adjusted Received Signal Strength Indicator (RSSI), wherein determining the adjusted RSSI comprises adding the received RSSI to a RSSI determined by the first AP and subtracting a reference RSSI.

9. The method of claim 8, wherein the adjusted RSSI is compared to a predetermined threshold, and wherein, if the adjusted RSSI is not above the predetermined threshold, ignoring the third AP in RRM calculations as being too far from the first AP.

10. An access point (AP) comprising:
    a radio;
    a memory;
    a processor in communication with the memory and the radio, the processor operable to conduct a method comprising:
        receiving, at a first Access Point (AP) of a first Extended Service Set (ESS), information about a third AP, of a second ESS, through a second AP also of the second ESS, wherein the information about the third AP, received by the second AP, is included in a Media Access Control (MAC) frame containing information associated with the third AP;
        based on the information about the third AP and/or second AP, determining, by the first AP, a metric associated with the third AP;
        based on the metric, conducting, by the first AP, Radio Resource Management (RRM) to account for the third AP;
        the first AP comparing the information associated with the third AP against a list of known neighbor APs; and
        if the list of known neighbor APs does not include the third AP, the first AP adding the third AP to the list for channelization and BSS color algorithms.

11. The AP of claim 10, wherein the metric is an adjusted Received Signal Strength Indicator (RSSI), and wherein determining the adjusted RSSI comprises adding a received RSSI to a constant adjustment factor.

12. An extended service set (ESS) comprising:
    a first Access Point (AP) operable to:
        receive information about a third AP from a second device, wherein both the second device and a third AP are associated with a second ESS, wherein the information about the third AP, received by the second AP, is included in a Media Access Control (MAC) frame containing information associated with the third AP;
        based on the information about the third AP, determining, by the first AP, an adjusted Received Signal Strength Indicator (RSSI) associated with the third AP;
        based on the adjusted RSSI, conducting, by the first AP, Radio Resource Management (RRM) to account for the third AP;
        the first AP comparing the information associated with the third AP against a list of known neighbor APs; and
        if the list of known neighbor APs does not include the third AP, the first AP adding the third AP to the list for channelization and BSS color algorithms.

13. The ESS of claim 12, wherein the information about the third AP is encrypted.

14. The ESS of claim 12, wherein the second device spoofs the first AP to appear as a client to associate with an open Service Set IDentifier (SSID) of the first AP.

15. The ESS of claim 12, wherein the second device is a sensor or a second AP.

16. The ESS of claim 12, wherein the ND information comprises one or more of a device type, a channel number, a bandwidth, a load, a received RSSI, a transmission power, a BSS color identifier, a number of spatial reuse opportunities, 5G bandwidth, 5G channels, or protocol support.

* * * * *